United States Patent
Choi

(10) Patent No.: US 7,086,069 B2
(45) Date of Patent: Aug. 1, 2006

(54) DISC TRAY FOR DECREASING VIBRATION AND NOISE IN OPTICAL DISC DRIVE, AND OPTICAL DISC DRIVE USING THE SAME

(75) Inventor: Myung-ryul Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 388 days.

(21) Appl. No.: 10/321,437

(22) Filed: Dec. 18, 2002

(65) Prior Publication Data

US 2003/0185131 A1 Oct. 2, 2003

(30) Foreign Application Priority Data

Apr. 2, 2002 (KR) .......................... 2002-18022

(51) Int. Cl.
*G11B 17/03* (2006.01)

(52) U.S. Cl. ..................................... 720/603

(58) Field of Classification Search ............... 720/601, 720/603; 369/75.1, 75.2, 77.1, 77.2
See application file for complete search history.

(56) References Cited

U.S. PATENT DOCUMENTS 6,493,310 B1 * 12/2002 Kim et al. ............... 369/263

FOREIGN PATENT DOCUMENTS

| JP | 03242893 A | * 10/1991 |
| KR | 2002-13200 | 2/2002 |

* cited by examiner

*Primary Examiner*—David D. Davis
(74) *Attorney, Agent, or Firm*—Staas & Halsey LLP

(57) ABSTRACT

A disc tray of an optical disc drive includes a tray body having a seating surface on which an optical disc is to be seated. The tray body is installed in the optical disc drive to slide in and out of the optical disc drive. The disc tray also includes a window bored through the disc tray so that an optical pickup to record or read data accesses the optical disc, and a vortex restraint unit which spatially restrains a vortex generated by a rotation of the optical disc.

39 Claims, 9 Drawing Sheets

320a

320b

320c

320d

DISC TRAY FOR DECREASING VIBRATION AND NOISE IN OPTICAL DISC DRIVE, AND OPTICAL DISC DRIVE USING THE SAME

CROSS REFERENCE TO RELATED APPLICATION

This application claims the benefit of Korean Application No. 2002-18022, filed Apr. 2, 2002, in the Korean Intellectual Property Office, the disclosure of which is incorporated herein by reference.

BACKGROUND OF THE INVENTION

1. Field of the Invention

The present invention relates to a disc tray of an optical disc drive, and more particularly, to a disc tray to decrease vibration and noise generated when an optical disc rotates.

2. Description of the Related Art

In general, optical disc drives record information on a recording surface formed of a concentric circular track on an optical disc, or read information from the recording surface. More specifically, the optical disc drives record or read data by irradiating a laser beam on the recording surface of the optical disc, which rotates by a constant linear velocity method, from an optical pickup which slides in a radial direction of the optical disc.

Generally provided in the optical disc drive is a disc tray on which the optical disc is to be loaded. A window is bored through the disc tray so that the optical pickup to record or read data may access the rotating optical disc.

In order to precisely read data recorded on the recording surface of the optical disc from the optical disc drive, or to precisely record data on the optical disc, a laser beam emitted from the optical pickup should be precisely incident on a track of the recording surface of the optical disc, and an optical axis of the beam irradiated from an actuator and the recording surface of the optical disc should always be maintained at a constant angle.

However, noise and vibration, which are generated by friction between the optical disc that rotates at a high velocity and air, resistance of air, and high velocity turbulent air flow, deteriorate recording and reproduction characteristics of the optical disc drive.

Korean Patent Application Nos. 1998-0013873 and 1998-0030740 address the above problem. FIG. 1A of Korean Patent Application Nos. 1998-0013873 shows a conventional apparatus to decrease noise in an optical disc drive, and FIG. 1B shows how a velocity gradient is removed by the structure of FIG. 1A.

As shown in FIGS. 1A and 1B, a plurality of blades 110 are provided on a seating surface 101 of a disc tray 100 so that a velocity gradient of air is removed from an inside of a boundary layer formed under an optical disc 190, when the optical disc 190 is seated on a turntable (not shown) and rotates at high velocity while floating on the seating surface 101.

The plurality of blades 110 are formed on the seating surface 101 of the disc tray 100 so that each blade of the plurality of blades 110 is inclined upward at an angle of 45? in a rotation direction 180 of the optical disc 190, as shown in FIG. 1B. The plurality of blades 110 extend in a radial direction of the optical disc 190, as shown in FIG. 1A.

When the optical disc 190 rotates at high velocity, a velocity gradient 150 which gradually increases toward the seating surface 101 of the disc tray 100 from a lower surface 191 of the optical disc 190, is formed in the boundary layer. In this state, if each blade of the plurality of blades 110 is installed as shown in FIG. 1B, the velocity gradient 150 of the boundary layer which is generated on the lower surface 191 of the optical disc 190 is removed while air flow passes through an incline of the blade 110. Thus, the air flow has a uniform velocity 160 toward the seating surface 101 of the disc tray 100 from the lower surface 191 of the optical disc 190. Accordingly, noise due to the velocity gradient 150 that is formed in the boundary layer is decreased.

However, in the conventional apparatus to decrease noise in the optical disc drive, the disc tray 100 is assumed to be a perfectly flat plate having openings. That is, the effect of the window 170, provided on the disc tray 100 so that the optical pickup (not shown) may access the recording surface of the optical disc 190, is excluded.

Vibration and noise are generated by friction between a high velocity rotating optical disc surface and air flow, and becomes severe as the velocity gradient and pressure gradient of air increase. From this point of view, the window 170 is a portion in which large variations in the velocity gradient and the pressure gradient of air flow appear.

FIG. 2 shows a vortex that is generated in a window of a conventional disc tray. As shown in FIG. 2, when the optical disc 190 rotates in a direction as shown by reference numeral 180, air flows in between a seating surface 201 and the optical disc 190 through a window 210, as shown by reference numeral 230. Then, a velocity gradient 220 of air gradually increases toward the seating surface 201 of the disc tray 200 from the lower surface 191 of the optical disc 190, and gradually increases toward an outside along the radial direction of the optical disc 190. As a result, a large vortex 240 is formed over the window 210 such that there is a great difference between pressures on right and left sides 250 and 260 of the window 210 and pressure in the window 210. The difference causes the vibration of the optical disc 190.

In addition, noise occurs at a boundary between the seating surface 201 and the window 210. Hence, in order to decrease noise and vibration in the optical disc drive, a vortex generated in the window and the pressure gradient of air should be removed or decreased.

SUMMARY OF THE INVENTION

Accordingly, it is an object of the present invention to provide a disc tray of an optical disc drive which is able to decrease noise and vibration that are generated in a window of the disc tray, and an optical disc drive using the same.

Additional objects and advantages of the invention will be set forth in part in the description which follows and, in part, will be obvious from the description, or may be learned by practice of the invention.

The foregoing and/or other objects of the present invention are achieved by providing a disc tray of an optical disc drive. The disc tray includes a tray body having a seating surface on which an optical disc is to be seated. The tray body is installed in the optical disc drive to to slide in and out of the optical disc drive. The disc tray also includes a window bored through the disc tray so that an optical pickup to record or read data accesses the optical disc, and a vortex restraint unit which spatially restrains a vortex generated by a rotation of the optical disc.

The foregoing and/or other objects of the present invention are achieved by providing an optical disc drive having a disc tray to accommodate an optical disc. The optical disc drive includes a tray body having a seating surface on which an optical disc is to be seated. The tray body is installed in the optical disc drive to slide in and out of the optical disc drive. The disc tray also includes a window bored through the disc tray so that an optical pickup to record or read data accesses the optical disc, and a vortex restraint unit which spatially restrains a vortex generated by a rotation of the optical disc.

According to an aspect of the invention, the vortex restraint unit includes at least one protrusion, formed inward to the window from edges of the window. The at least one protrusion is formed along one edge of the edges of the window, is horizontally symmetrical along the edges of the window, or is horizontally intercalate to each other along the edges of the window. In addition, the protrusions are formed of a flexible material, which moves along with air flow generated by the rotation of the optical disc. The protrusions include a through hole formed in the protrusion. An embossing is formed on a surface of the protrusion opposite to the optical disc.

BRIEF DESCRIPTION OF THE DRAWINGS

The above and other objects and advantages of the invention will become apparent and more appreciated from the following description of the preferred embodiments, taken in conjunction with the accompanying drawings of which.

DETAILED DESCRIPTION OF THE INVENTION

Figure 1A:
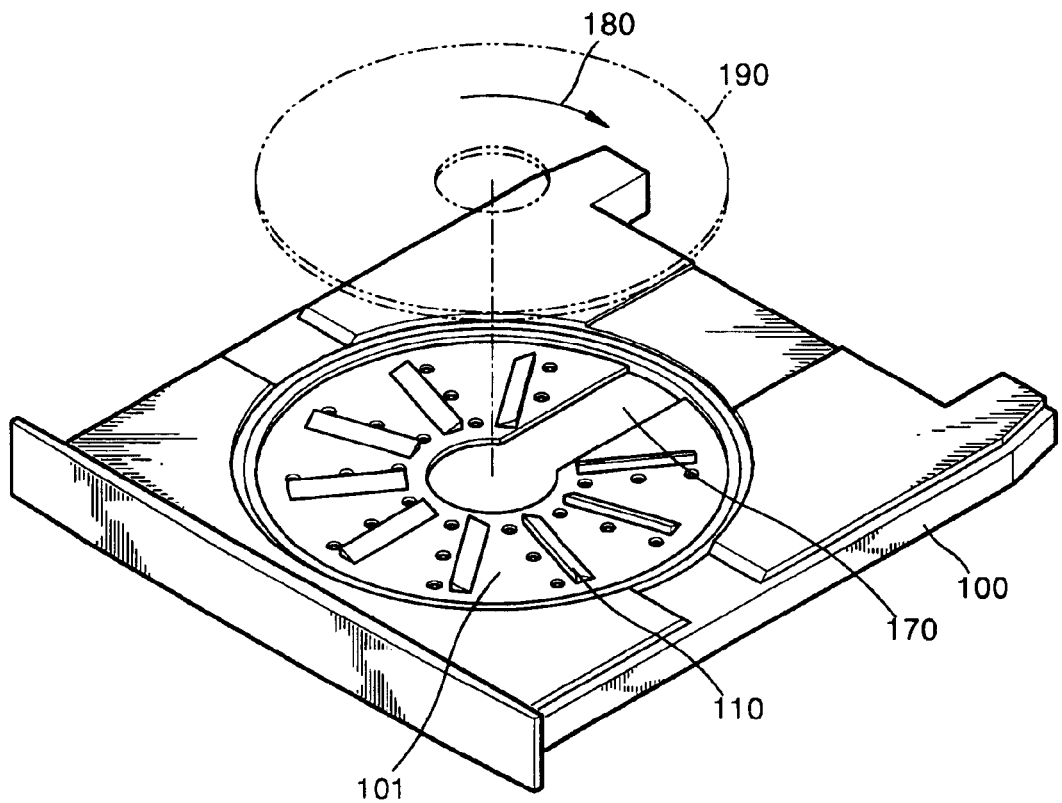
FIG. 1A shows a perspective view of a conventional apparatus to decrease noise in an optical disc drive.
Figure 1B:
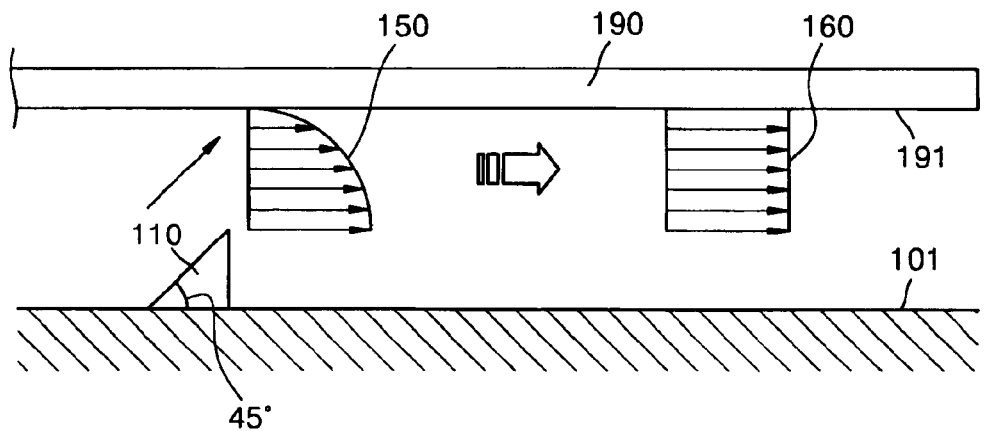
FIG. 1B shows how a velocity gradient is removed by the structure of FIG. 1A.

Reference will now be made in detail to the present preferred embodiments of the present invention, examples of which are illustrated in the accompanying drawings, wherein like reference numerals refer to like elements throughout.

Figure 3A:
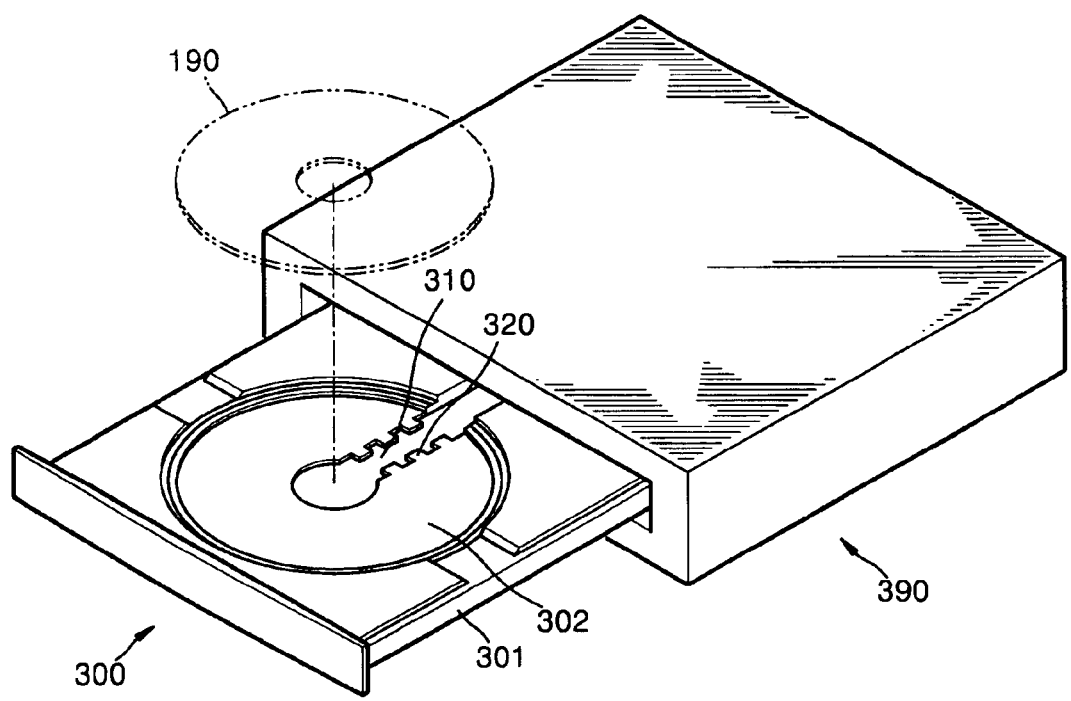
FIG. 3A shows a perspective view illustrating a disc tray of an optical disc drive, according to an embodiment of the present invention.
Figure 3B:
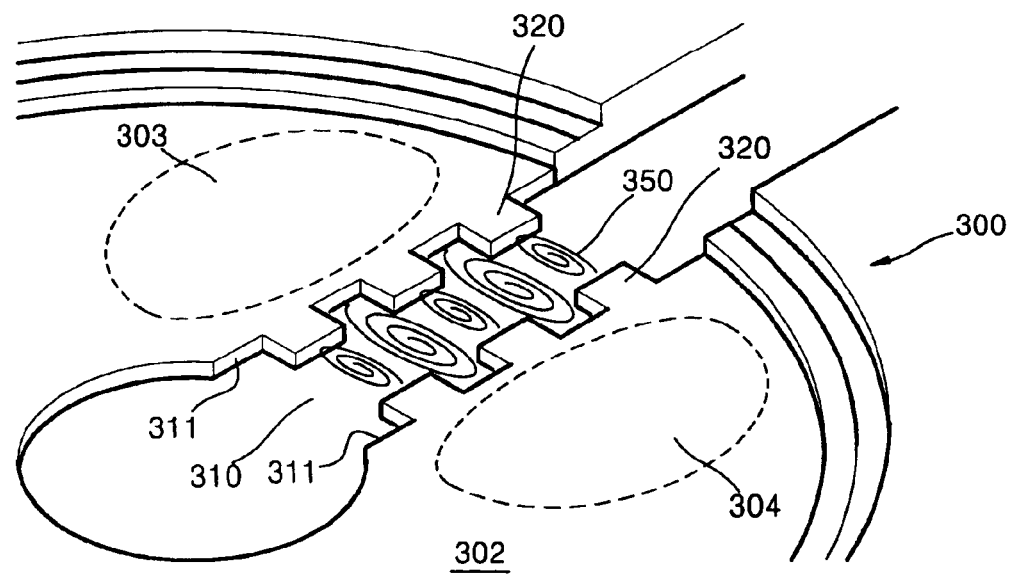
FIG. 3B shows a perspective view illustrating a vortex formed in the structure of FIG. 3A.

FIG. 3A shows a perspective view illustrating a disc tray of an optical disc drive, according to an embodiment of the present invention, and FIG. 3B shows a perspective view illustrating a vortex formed in the structure of FIG. 3A.

As shown in FIGS. 3A and 3B, a disc tray 300 includes a tray body 301 installed in an optical disc drive 390 to slide in and out of the optical disc drive 390, and a seating surface 302 formed on the tray body 301, on which an optical disc 190 is to be seated. In addition, a window 310 bored through the seating surface 302 is provided in the tray body 301 so that an optical pickup (not shown) to record or read data accesses the optical disc 190.

The window 310 is formed in a sliding direction of the optical pickup (not shown) from a center of the optical disc 190, and is generally formed in a sliding direction of the tray body 301.

A vortex restraint unit is provided and includes a plurality of protrusions 320 formed to be horizontally symmetrical inward to the window 310 from both edges 311 of the window 310. In the present invention, three protrusions 320 are formed on each of right and left sides of the window 310, but one or more protrusions 320 may be formed.

If the protrusions 320 are formed in the above-mentioned manner, a vortex generated near the window 310 is split in a plurality of small vortices 350. Even though the plurality of small vortices 350 are connected to one another, one large vortex cannot be formed due to a spatial limit caused by the protrusions 320. Therefore, the vortex is restrained in a space in the window 310 excluding the protrusions 320.

Figure 2:
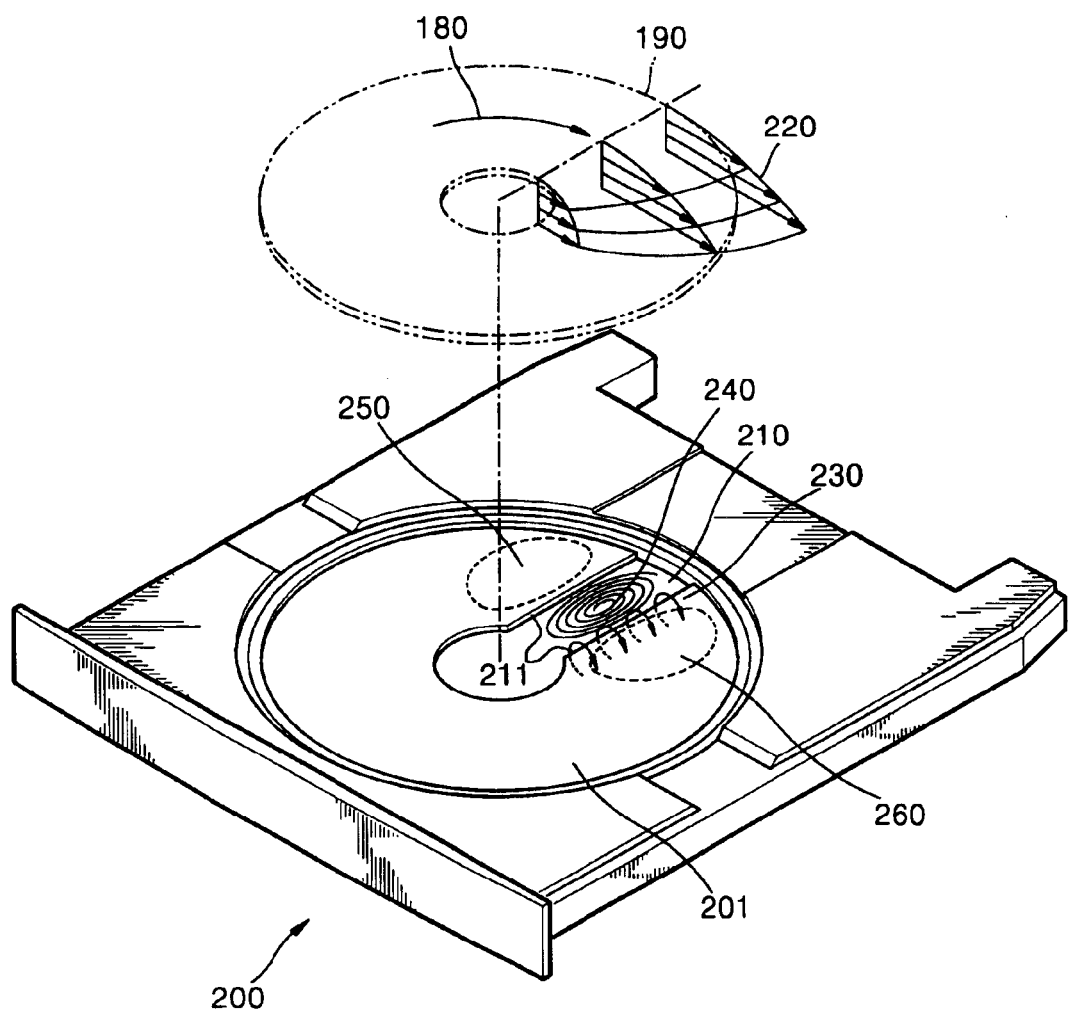
FIG. 2 shows a perspective view illustrating a vortex generated in a window of a conventional disc tray.

That is, as shown in FIG. 2 of the prior art, the large vortex 240 corresponding to an entire size of the window 210 is formed by the velocity gradient 220 of air flow. However, as shown in FIG. 3A, due to a spatial limit caused by the protrusions 320, the one vortex is split into the plurality of small vortices 350, or a restrained vortex is formed. Then, due to the plurality of small vortices 350 with small energies, or the vortex spatially restrained by the protrusions 320, pressure in the window 310 becomes smaller than pressure generated by the large vortex 240 due to an absence of protrusions.

Thus, a difference between pressure values 303 and 304 and pressure value in the window 310 decreases, thereby decreasing vibration of the optical disc caused by rapid variations in pressure and noise caused by pressure shock.

Figure 4A:
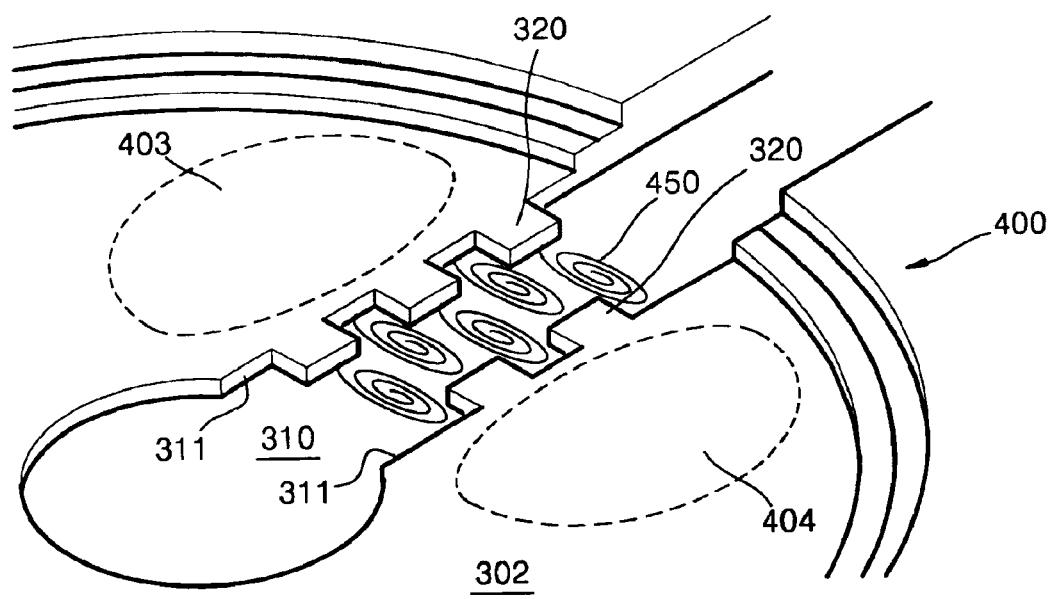
FIG. 4A shows a perspective view illustrating the disc tray of an optical disc drive, according to another embodiment of the present invention.

FIG. 4A shows a perspective view illustrating the disc tray of an optical disc drive, according to another embodiment of the present invention. As shown in FIG. 4A, the protrusions 320 are formed to horizontally intercalate each other along the edges 311 of the window 310 of a disc tray 400. In this case, a vortex is split into a plurality of small vortices 450 depending on a location of the protrusions 320, or is spatially restrained according to the location of the protrusions 320.

Then, due to the plurality of small vortices 450 with small energies or the vortex spatially restrained by the protrusions 320, pressure in the window 310 becomes smaller than pressure generated by the large vortex 240 of FIG. 2. Thus, a difference between pressure values 403 and 404 and pressure value in the window 310 decreases, thereby decreasing vibration of the optical disc caused by rapid variations in pressure and noise caused by pressure shock.

Figure 4B:
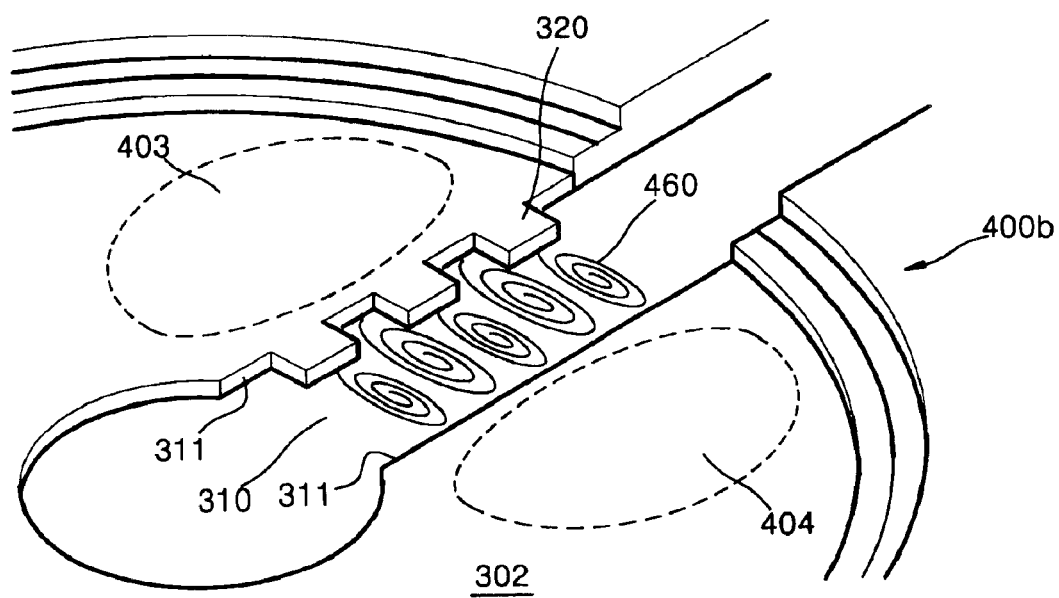
FIG. 4B shows a perspective view illustrating the disc tray of an optical disc drive, according to another embodiment of the present invention.

FIG. 4B shows a perspective view illustrating the disc tray of an optical disc drive, according to another embodiment of the present invention. As shown in FIG. 4B, the protrusions 320 may be formed along only the left edge 311 of the window 310.

As described above, because of the above structure, a vortex is split into a plurality of small vortices 460 depending on a location of the protrusions 320, or is spatially restrained according to the location of the protrusions 320.

Although not shown, the protrusions 320 may be formed along only the right edge 311 of the window 310.

Figure 5:
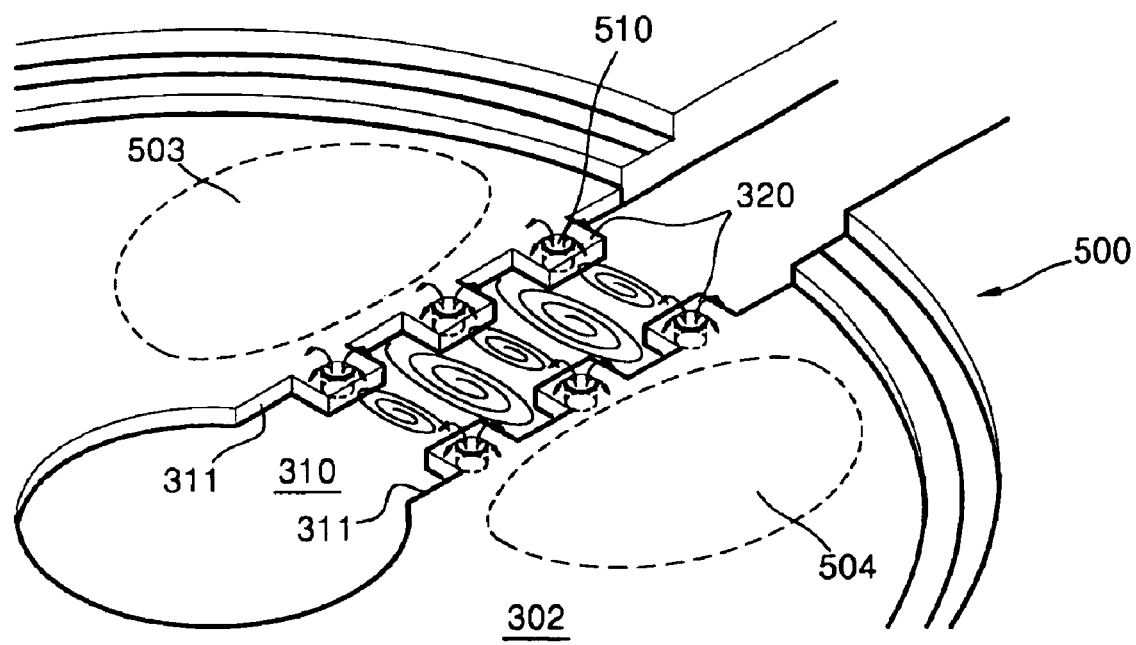
FIG. 5 shows a perspective view illustrating the disc tray of an optical disc drive, according to another embodiment of the present invention.
Figure 6A:
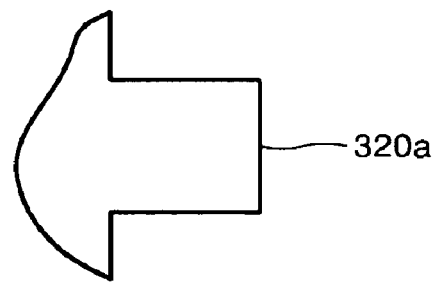
FIGS. 6A through 6G shows plan views illustrating various embodiments of a protrusion, according to the present invention, respectively.
Figure 6B:
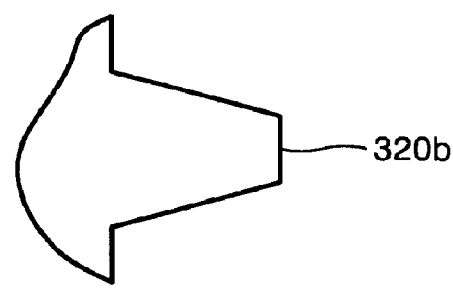
Figure 6C:
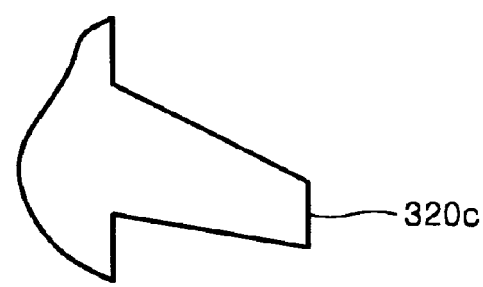
Figure 6D:
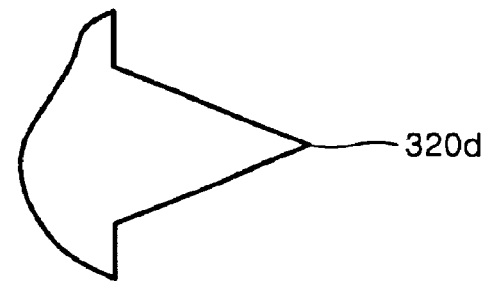
Figure 6E:
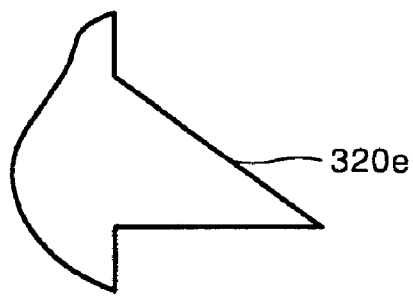
Figure 6F:
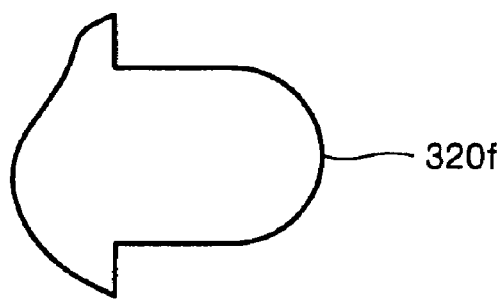
Figure 6G:
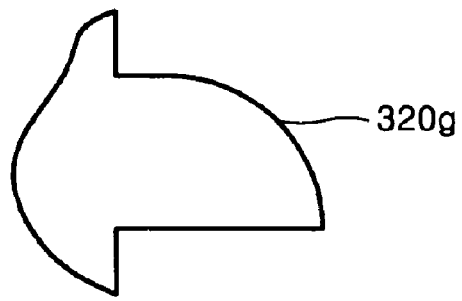
Figure 7A:
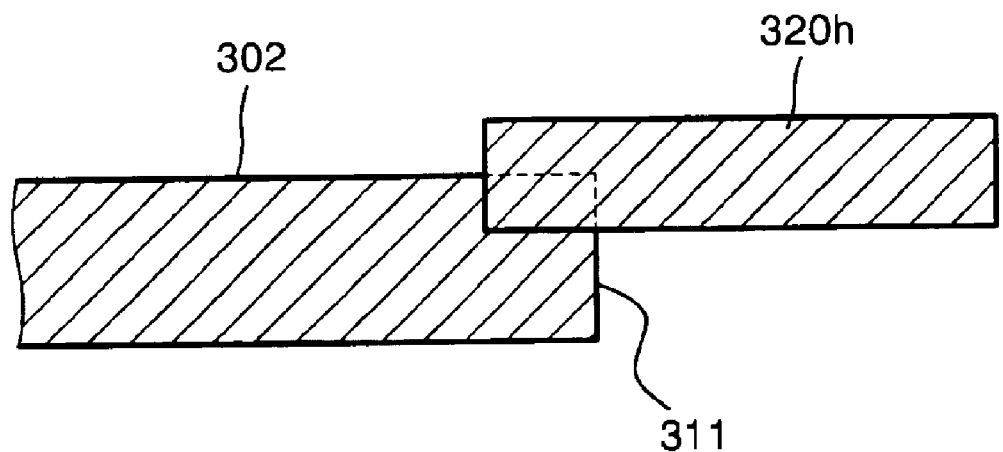
FIGS. 7A through 7D shows vertical cross-sectional views illustrating various embodiments of a protrusion, according to the present invention, respectively.
Figure 7B:
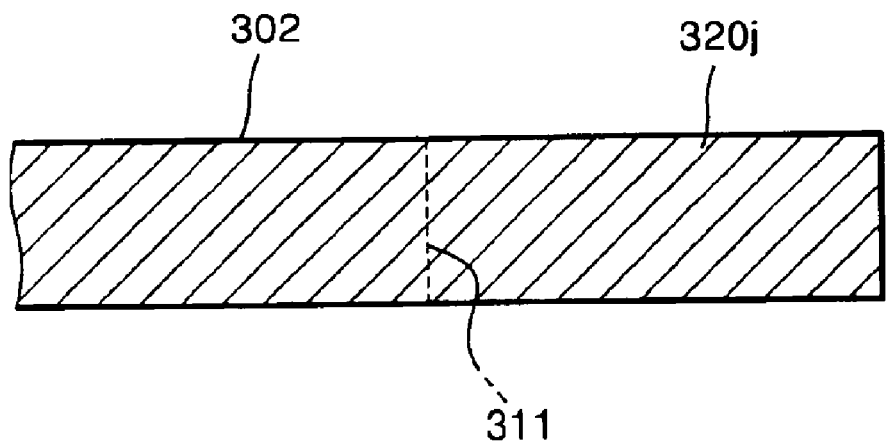
Figure 7C:
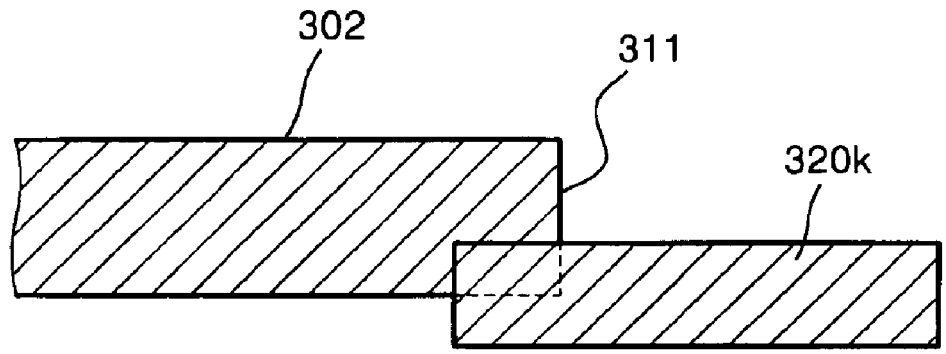
Figure 7D:
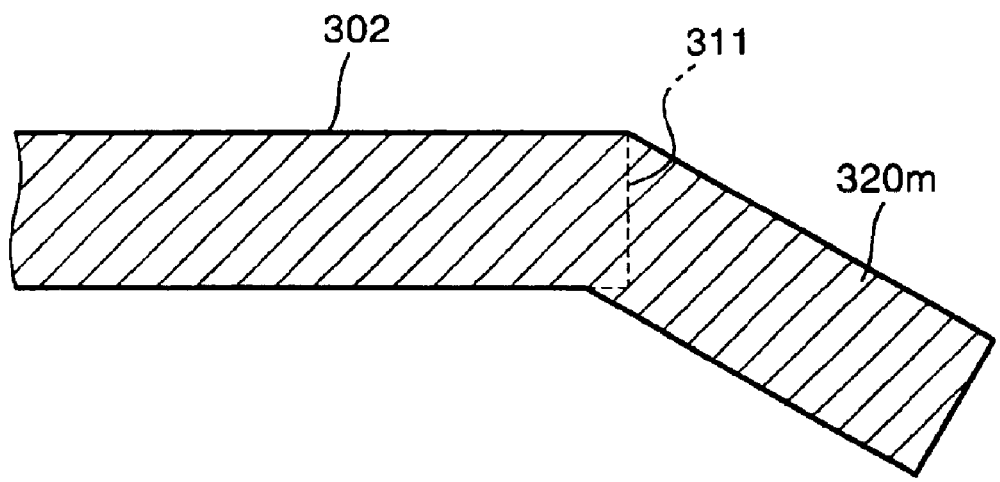

FIG. 5 shows a perspective view illustrating the disc tray of an optical disc drive, according to another embodiment of the present invention. As shown in FIG. 5, a through hole 510 is formed in each protrusion 320 such that air may flow in or out through the hole 510 toward upper and lower surfaces of a disc tray 500. In the present invention, one through hole 510 is formed in each protrusion 320, but two or more through holes 510 may be formed in each protrusion 320. A size of the through hole 510 is predetermined to suitably decrease vibration and noise.

According to the above structure, a pressure gradient that exists on the upper and lower surfaces of the disc tray 500 may be reduced using the through hole 510. That is, air flows in or out, toward the upper and lower surfaces of the disc tray 500, through the through hole 510, thereby reducing a pressure difference between the seating surface 302 and the lower surface of the disc tray 500.

In particular, the through hole 510 is formed in each of the protrusions 320 formed in the window 310, thereby reducing a pressure difference of air flow flowing in the window 310 from a side 503, air flow flowing out a side 504 from the window 310, and air current flowing through the window 310. Accordingly, formation of a strong vortex is prevented and disc vibration is reduced.

Further, a rough material of about several tens of μm to several hundreds of μm, or an embossing may be formed on a surface of the protrusions 320. Thus, a velocity gradient of air flow which gradually increases toward the seating surface 302 of the disc trays 300, 400, or 500 from the lower surface 191 of the optical disc 190, may be reduced by the roughness. Thus, the air flow under the boundary layer is prevented from separating before flowing in the window 310 or the separation is delayed, to form a weak vortex by reducing the energy of the vortex.

In addition, the embossing serves as an air cushion to absorb vibration of the optical disc 190 that is generated by a velocity gradient and a pressure gradient of air flow, and to reduce friction between the seating surface 302 of the disc tray 300, 400, or 500 and air flow in the boundary layer, thereby decreasing noise. Accordingly, vibration and noise of the optical disc 190 is reduced by forming the roughness or embossing on the surface of the protrusions 320.

According to another embodiment of the present invention, the protrusions 320 may be formed of a flexible material, which moves along the flow of air that is generated by the rotation of the optical disc 190.

In case of using the flexible material, a drag, which is resistance caused by separation of air flow generated on the upper surface of the protrusions 320, may be reduced by a compliant wall effect. That is, the separation occurs when an air flow generated by a high velocity rotation of the optical disc 190 rubs against the seating surface 302 of the disc tray 300, 400, or 500. When using the flexible material as described above, a surface of the flexible material interacts with the boundary layer that is formed by the air flow. While the boundary layer is maintained and separation is delayed, the drag generated by separation is reduced. By reducing the drag, energy consumption of a motor to drive an optical disc may also be reduced.

FIGS. 6A through 6G shows plan views illustrating various embodiments of a protrusion, according to the present invention, respectively. As shown by reference numerals 320a through 320g, protrusions may be formed in various shapes such as a rectangle, trapezoid, triangle, or circle.

FIGS. 7A through 7D shows vertical cross-sectional views illustrating various embodiments of a protrusion, according to the present invention, respectively. As shown by reference numerals 320h, 320j, 320k, and 320m, protrusions may be formed to have the same height as that of a seating surface 302, a height higher than the seating surface 302, a height lower than the seating surface 302, and may also be inclined downward relative to the seating surface 302.

In forming the protrusions 320 as described above, the protrusions 320 may be formed as a single body with the disc tray 300, 400, or 500, or combined with the disc tray 300, 400, or 500 by forming the protrusions 320 as an additional part. In addition, a plane or section shape of the protrusions 320 is not limited to the shapes shown in FIGS. 6A through 6G and FIGS. 7A through 7D. Thus, a protrusion having various shapes may be arranged in various forms and predetermined by considering a reduction in vibration and noise.

As described above, according to the present invention, a disc tray to decrease vibration and noise has the following advantages.

First, a plurality of small and weak vortices are generated in the window of the disc tray, and a pressure variation near the window is reduced, thereby preventing vibration and noise. Second, vibration and noise are reduced, and thus precision of an optical pickup is improved, and high velocity and high density recording and reproduction may be performed.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disc tray of an optical disc drive, comprising:
   a tray having a seating surface on which an optical disc is to be seated, the tray being installed in the optical disc drive to slide in and out of the optical disc drive;
   a window bored through the tray so that an optical pickup to record or read data accesses the optical disc; and
   a vortex restraint unit, which spatially restrains a vortex generated by a rotation of the optical disc, to protrude into the window without substantially interfering with the optical pickup.

2. The disc tray as claimed in claim 1, wherein the vortex restraint unit comprises:
   at least one protrusion formed inward to the window from edges of the window.

3. The disc tray as claimed in claim 2, wherein the at least one protrusion is formed along one edge of the edges of the window.

4. The disc tray as claimed in claim 2, wherein the at least one protrusion is formed to be horizontally symmetrical along the edges of the window.

5. The disc tray as claimed in claim 2, wherein the at least one protrusion is formed to horizontally intercalate each other along the edges of the window.

6. The disc tray as claimed in claim 2, wherein the at least one protrusion is formed of a flexible material, which moves along with air flow generated by the rotation of the optical disc.

7. The disc tray as claimed in claim 2, wherein the at least one protrusion includes a through hole formed in the protrusion so that air flows in and out the through hole toward upper and lower surfaces of the tray so as to reduce a pressure gradient existing on the upper and lower surfaces of the disc tray.

8. The disc tray as claimed in claim 2, wherein an embossing is formed on a surface of the protrusion opposite to the optical disc, reducing a velocity gradient of air flow which gradually increases toward the seating surface of the tray from a lower surface of the optical disc.

9. The disc tray as claimed in claim 2, wherein a roughness is formed on a surface of the protrusion opposite to the optical disc, reducing a velocity gradient of air flow which gradually increases toward the seating surface of the tray from a lower surface of the optical disc.

10. An optical disc drive to accommodate an optical disc, the optical disc drive comprising:
 a tray having a seating surface on which the optical disc is to be seated, the tray being installed in the optical disc drive to slide in and out of the optical disc drive;
 a window bored through the tray so that an optical pickup to record or read data accesses the optical disc; and
 a vortex restraint unit, which spatially restrains a vortex generated by a rotation of the optical disc, to protrude into the window without substantially interfering with the optical pickup.

11. The optical disc drive as claimed in claim 10, wherein the vortex restraint unit comprises:
 at least one protrusion formed inward to the window from edges of the window.

12. The optical disc drive as claimed in claim 11, wherein the at least one protrusion is formed along one edge of the edges of the window.

13. The optical disc drive as claimed in claim 11, wherein the at least one protrusion is formed to be horizontally symmetrical along the edges of the window.

14. The optical disc drive as claimed in claim 11, wherein the at least one protrusion is formed to horizontally intercalate each other along the edges of the window.

15. The optical disc drive as claimed in claim 11, wherein the at least one protrusion is formed of a flexible material, which moves along with air flow generated by the rotation of the optical disc.

16. The optical disc drive as claimed in claim 11, wherein the at least one protrusion includes a through hole formed in the protrusion so that air flows in and out the through hole toward upper and lower surfaces of the disc tray, reducing a pressure gradient existing on the upper and lower surfaces of the tray.

17. The optical disc drive as claimed in claim 11, wherein an embossing is formed on a surface of the protrusion opposite to the optical disc, reducing a velocity gradient of air flow which gradually increases toward the seating surface of the tray from a lower surface of the optical disc.

18. The optical disc drive as claimed in claim 11, wherein a roughness is formed on a surface of the protrusion opposite to the optical disc, reducing a velocity gradient of air flow which gradually increases toward the seating surface of the tray from a lower surface of the optical disc.

19. A disc tray of an optical disc drive, including a tray having a seating surface to seat an optical disc thereon and to be installed in the optical disc drive to slide in and out of the optical disc drive, and a window bored therein so as to allow an optical pickup to have access to the optical disc, the disc tray comprising:
 a vortex restraint unit, which spatially restrains a vortex generated by a rotation of the optical disc, to protrude into the window without substantially interfering with the optical pickup.

20. The disc tray as claimed in claim 19, wherein the vortex restraint unit comprises:
 a plurality of protrusions formed inward to the window from sides of the window.

21. The disc tray as claimed in claim 20, wherein the plurality of protrusions are formed to be horizontally symmetrical along the sides of the window.

22. The disc tray as claimed in claim 20, wherein the plurality of protrusions are formed along one side of the sides of the window.

23. The disc tray as claimed in claim 20, wherein the plurality of protrusions are formed to horizontally intercalate each other along the sides of the window.

24. The disc tray as claimed in claim 20, wherein the plurality of protrusions are formed of a flexible material, which moves along with air flow generated by the rotation of the optical disc, reducing a drag resistance caused by a separation of air flow on upper surfaces of the protrusions and energy consumption of a motor to drive the optical disc.

25. The disc tray as claimed in claim 20, wherein the plurality of protrusions each include a through hole formed on an inside thereof so that air flows in and out the through hole toward upper and lower surfaces of the disc tray, reducing a pressure gradient existing on the upper and lower surfaces of the disc tray.

26. The disc tray as claimed in claim 25, wherein the through hole is formed to reduce a pressure difference between the seating surface and the lower surface of the disc tray.

27. The disc tray as claimed in claim 25, wherein a size of the through hole is predetermined to suitably decrease vibration and noise.

28. The disc tray as claimed in claim 25, wherein the through hole is formed to reduce a pressure difference of air flow flowing in the window from one side, air flow flowing out another side of the window from the window, and air current flowing through the window.

29. The disc tray as claimed in claim 20, wherein an embossing is formed on a surface of the protrusions opposite a side of the optical disc, reducing a velocity gradient of air flow which gradually increases toward the seating surface of the disc tray from a lower surface of the optical disc.

30. The disc tray as claimed in claim 29, wherein the embossing serves as an air cushion to absorb vibration of the optical disc generated by the velocity gradient and a pressure gradient of air flow, and to reduce friction between the seating surface of the disc tray and air flow in a boundary layer formed under the optical disc.

31. The disc tray as claimed in claim 20, wherein a roughness is formed on a surface of the protrusions opposite a side of the optical disc, reducing a velocity gradient of air flow which gradually increases toward the seating surface of the disc tray from a lower surface of the optical disc.

32. The disc tray as claimed in claim 20, wherein the plurality of protrusions are formed inward to the window from the sides thereof so that a vortex generated near the window is split into a plurality of small vortices.

33. The disc tray as claimed in claim 32, wherein the plurality of protrusions are provided so that pressure values formed on opposite sides of the window relative to a pressure value in the window decrease, decreasing vibration of the optical disc.

34. The disc tray as claimed in claim 20, wherein the plurality of protrusions include a plurality of through holes formed on an inside thereof so that air flows in and out the through holes toward upper and lower surfaces of the disc tray, thereby reducing a pressure gradient existing on the upper and lower surfaces of the disc tray.

35. The disc tray as claimed in claim 20, wherein the protrusions are formed in a shape of a rectangle, trapezoid, triangle, or circle.

36. The disc tray as claimed in claim 20, wherein the protrusions are formed to have a same height of the seating surface, a height higher than the seating surface, or a height lower than the seating surface.

37. The disc tray as claimed in claim 20, wherein the protrusions are formed to be inclined downward relative to the seating surface.

38. The disc tray as claimed in claim 20, wherein the protrusions are formed as a single body with the disc tray or as an additional part.

39. The disc tray as claimed in claim 19, wherein the vortex restraint unit comprises:

at least one protrusion formed inward to the window from sides of the window.

* * * * *